United States Patent [19]

Nestmeier

[11] Patent Number: 4,878,753

[45] Date of Patent: Nov. 7, 1989

[54] METHOD FOR MEASURING DOUBLE PRINT OFFSET IN PRINTING SYSTEMS

[75] Inventor: Johannes Nestmeier, Munich, Fed. Rep. of Germany

[73] Assignee: MAN Technologie GmbH, Munich, Fed. Rep. of Germany

[21] Appl. No.: 293,644

[22] Filed: Jan. 5, 1988

[30] Foreign Application Priority Data

Jan. 14, 1988 [DE] Fed. Rep. of Germany ....... 3800877

[51] Int. Cl.[4] ............................................ G01N 21/89

[52] U.S. Cl. .................................. 356/237; 250/561; 356/430

[58] Field of Search ............... 356/237, 429, 430, 375; 250/561

[56] References Cited

U.S. PATENT DOCUMENTS 2,278,933 4/1942 Kott ............................... 250/561 X

*Primary Examiner*—Vincent P. McGraw

*Attorney, Agent, or Firm*—Roberts, Spiecens & Cohen

[57] ABSTRACT

The specification describes a method for measuring the offset between regular images of, for instance, halftone dots and double images thereof, in which a test screen pattern is printed along an edge of the paper web to be printed which consists of two rows of test pattern strips representing a fishbone pattern. Using two sensors the gray values of the two test pattern rows are scanned and supplied to a double element printing measuring device. On the basis of the results of measurement and the geometrical relationships of the test strips and of the test edges arising owing to double printing phenomena the degree of double print offset may be determined. The method may be used for on line measurement of the degree of double print offset during the operation of the printing press.

13 Claims, 4 Drawing Sheets

METHOD FOR MEASURING DOUBLE PRINT OFFSET IN PRINTING SYSTEMS

BACKGROUND OF THE INVENTION

The invention relates to a method of measuring offset between doubly printed elements, such as halftone dots, in printed matter, in printing systems in which a test pattern is printed and then evaluated.

The quality with which halftone dots are printed by printing cylinders on paper in printing presses depends on many factors, whose origins are to be found mainly in the details of the technical design of the press (more particularly an offset litho press) and in the dynamics of press operation. For instance rotary vibrations of the cylinders, unfavorable settings between the blanket cylinder and the impression cylinder, unfavorable climatic conditions and the like, may lead to double element printing, that is to say to a double or ghost printing of halftone dots so that in addition to the densely printed halftone dot there is further adjacent shadow-like dot which is less dense and is frequently smaller in diameter. Although the printing of halftone dots is the main consideration here, it is obvious that the invention may be centered on the double printing of other features.

In order to detect the causative factors such dot doubling phenomena are observed by using test patterns. The degree of dot doubling is then expressed as the center distance between the original and ghost dot in mm. This has so far been done under a microscope using a suitable scale. The values then produced are then processed, for instance in a computer, which carries out a fourier analysis. This process is however relatively complex and furthermore the accuracy of the method depends on the observer, who measures the degree of double dot offset.

SUMMARY OF THE INVENTION

The object of the invention is to provide a method of the initially mentioned type in which measurements relating to double dot printing may be carried out more precisely and more rapidly than has hithero been possible.

In order to achieve this object a test pattern is used consisting of test strips, which are arranged in the form of a fishbone pattern and the gray values of this test pattern are scanned using two sensors and the data so produced are evaluated.

In this method the use of the fishbone pattern makes it possible to ascertain not only the degree of double dot offset but also the direction of the double dot offset directly. This involves the advantage that with the method of the invention the test pattern is able to be scanned while the press is running automatically. This also makes possible a continuous check on printing quality in respect to double dot printing phenomena.

The strips of the two rows of strips forming the fishbone pattern are preferably set at an angle of 90° to each other. This leads to a simple geometrical arrangement, from which the double dot printing offset in the circumferential and axial directions may be derived using simple formulas, more especially if the sensors are arranged to intersect the strips in a direction parallel to the apex of the fishbone pattern.

In accordance with one form of the invention in the test pattern, in at least one row of strips there are groups of strips, which are separated from each other respectively by a predetermined breadth of unprinted paper. The latter may serve as special marks, which are also sensed by the sensors and yield for instance an automatic measurement of the length of the paper moving past. A further advantageous feature is that it is then not necessary to produce a test screen pattern which is true to size along a long length and it is only necessary for individual, identical modules to be pieced together.

The sensors respond to the gray values of the strip pattern in order to finally derive the double element print offset therefrom. For this purpose the test screen pattern is printed onto the paper to be printed and scanned during motion in the printing equipment by means of a light source, which is arranged under the printed paper at a suitable point and a light guide, which receives the light shining through the paper and conducts it to a measuring device.

In the measuring device the gray signals are preferably converted into rectangular signals, which provide a gray value comparison with a given lower threshold value. The breadth of such pulse signals, which corresponds to the breadth of the test pattern strip, may then be detected and evaluated in accordance with various criteria, as for example by measuring time, by counting the clock cycles etc.

In order to be able to cope with very small double dot print offset the lower threshold value is preferably to be so selected that it is only a little above the gray value for the non-printed paper. Thus all gray values from full density to the least densely printed gray tone enter into the rectangular signal.

In accordance with a further development of the invention in addition to the lower threshold value an upper threshold value is selected, which is just under the full density gray value and thus forms rectangular signals which represent the gray values over the upper threshold value. By making a comparison of the two rectangular signals it is then possible to derive the direction of the double dot print offset. If the two rectangular signals of a test signal are approximately equal, this will then mean that the measured strip is practically completely in the full density range and thus there is no double dot print offset. On the other hand a difference in the two rectangular signals will serve to show that there is a double dot printing offset since the less dense gray tone for the double dot printing is included in the one rectangular signal while it is not included in the other rectangular signal. Dependent on whether the difference between the two is predominant on the rising or the descending pulse flank, it will be a question of a trailing or leading double dot printing effect.

A simple method of evaluating the rectangular signals is one in which the position of the flanks of the rectangular signal is counted with a digital clock pulse and to use the count in order to compute the double dot printing offset.

Using the clock pulse values so measured, that is to say the counts, it is possible to compute a relative degree of double dot printing using a simple relationship, i.e. $d_n \pm (2n_b - n_r)/n_r$, in which $n_b$ denotes the count for the breadth of the test pattern strip with double dot print offset and $n_r$ denotes the count for the distance between the initial or end edges of two adjacent strips. Since the breadth of the strips of the test screen pattern is selected to be equal to the breadth of the gaps therebetween, for the computation it is not necessary to know the absolute breadth of the test pattern strip and the speed of the paper feed so that differences in the paper speed are not relevant.

The accuracy of the measurements may be improved by the selection of a high clock frequency, as for instance one in the MHz range, for the counting operation.

In accordance with a further proposal of the invention a mean value of the measured values or data for a predetermined number of test pattern strips is taken for computation of the double dot printing offset. This makes it possible for errors to be compensated for which are due to frayed paper edges of the test strips, lack of homogeneity of the paper, fine variations in the amount of ink applied etc. This makes it possible to achieve a more reliable result of measurement.

It is an advantage if in addition to the test pattern a full density zone and non-printed paper are scanned and the readings are used to derive the upper and lower threshold values for the measurement of the test screen pattern. The position of the threshold values may thus be automatically adapted to the respective paper being used and to the printing ink employed. Furthermore lighting conditions may be taken into account. The threshold values should be placed as close as possible to the corresponding limit values of the gray tone in order to enhance the quality of measurement. The detection of the full density tone and of the non-printed paper may be undertaken with the same sensors as used for measurement of the test pattern. It is however also possible to use an additional sensor or a pair of sensors separate therefrom.

The invention will now be described in more detail with reference to the drawings.

LIST OF THE SEVERAL FIGURES OF THE DRAWINGS

FIG. 1 and

DETAILED ACCOUNT OF THE INVENTION

Figure 1:
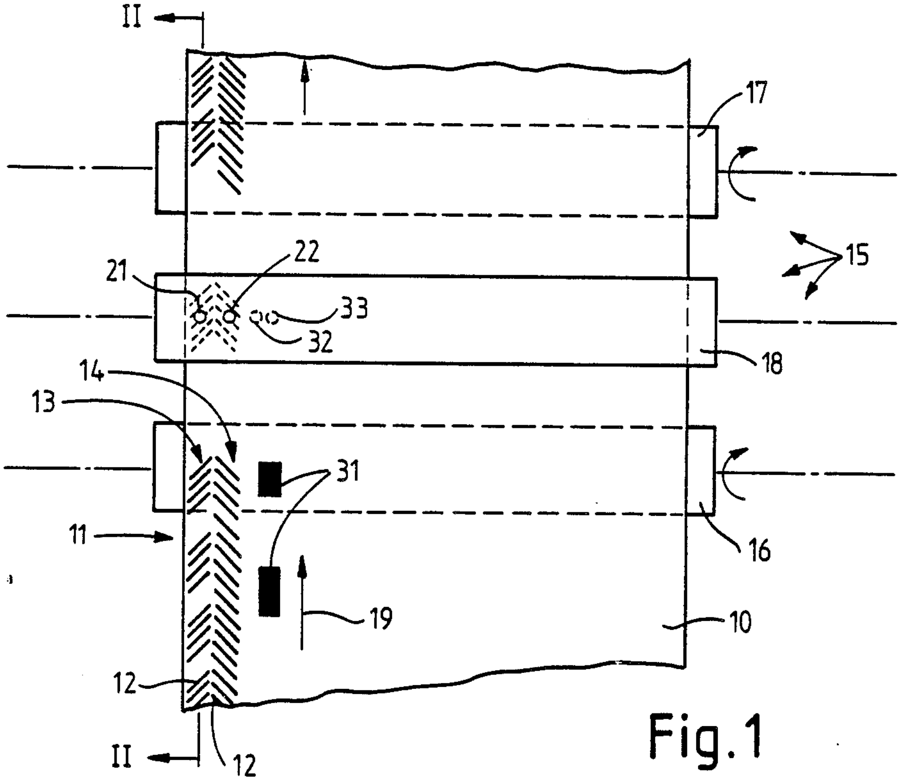
Figure 2:
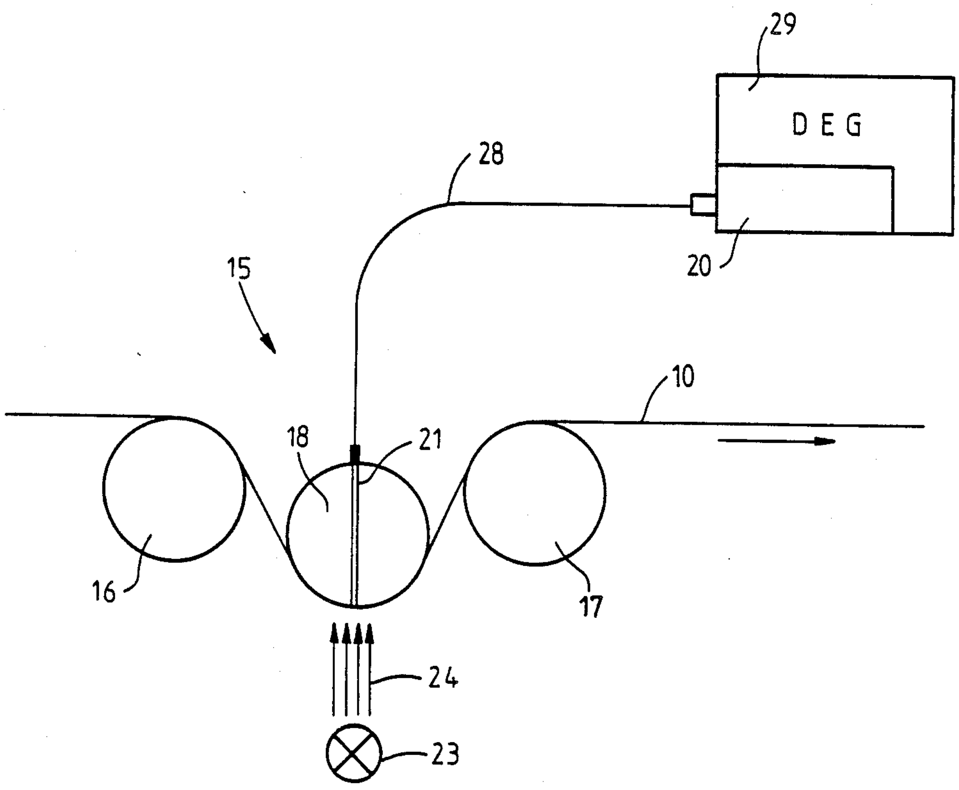
FIG. 2 show an arrangement for performing the method in accordance with the invention in plan view and, respectively, in cross section.

In order to detect double dot printing phenomena on a printing press while the press is running a test screen dot pattern 11 is printed along one edge of the paper 10 being printed. The pattern 11 consists of a plurality of test pattern strips 12, which are divided up into two rows 13 and 14 like a fishbone pattern. At a suitable position in the press equipment, e.g. to the rear of a dry, not shown, there is a sensor arrangement 15, which as will be seen from FIGS. 1 and 2 is made up of two guide rolls 16 and 17 and a measuring cylinder 18, which are arranged to be parallel to each other and between which the paper web 10 is passed in the direction of the arrow 19.

The measuring cylinder 18 is provided with two holes 21 and 22 for the arrangement of optical sensors 20, such holes 21 and 22 extending normal to the paper 10 running under the measuring cylinder 18 through the press so that in the hole under the measuring cylinder 18 there is a light source 20 whose light rays 24 are directed parallel to the holes 21 and 22, under which the test pattern 11 is shone upon from the non-printed paper side. The sensor 20 comprises two light guide fibers 28, which extend respectively through the holes 21 and 22 in the measuring cylinder 18 and serve to receive the rays passing through the paper 10. The measured values are evaluated or processed by a device 29 to measure the degree of double dot printing offset.

Figure 3:
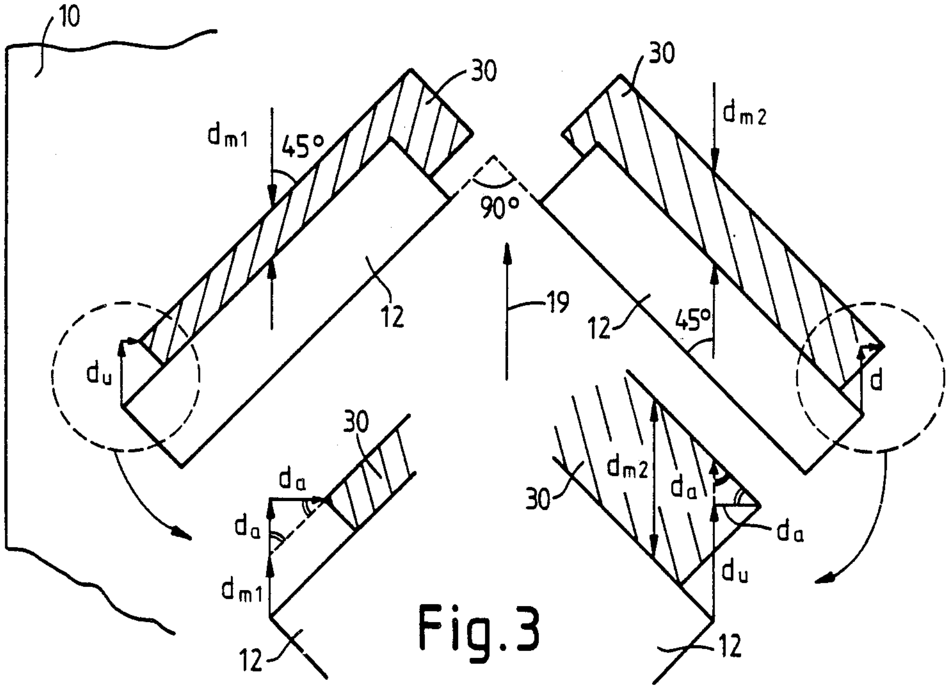
FIG. 3 is a view of part of the structure to be seen in FIG. 1.

The initially described double dot printing phenomena, which are to be detected with the method are illustrated in FIG. 3 on two test pattern strips 12, rectangular test pattern strips 12 being assumed. The two test pattern strips 12 illustrated in FIG. 3 are representative for the strips of a respective row 13 and, respectively, 14 of the fishbone pattern. They are arranged at 90° to each other so that simple geometrical relationships result, which facilitate evaluation.

In addition to the test pattern strips 12 properly so called the double dot printing effects also appear which are in the form of shadows or ghosts with a lower ink density. This second impression is marked in broken lines in FIG. 3 and indicated by reference 30. In order to detect the so-called double dot edge 30 the gray value of the paper moving past under the light guide 28 and of the test pattern 11 is measured and plotted against time or against the length of paper passing through.

Figure 4:
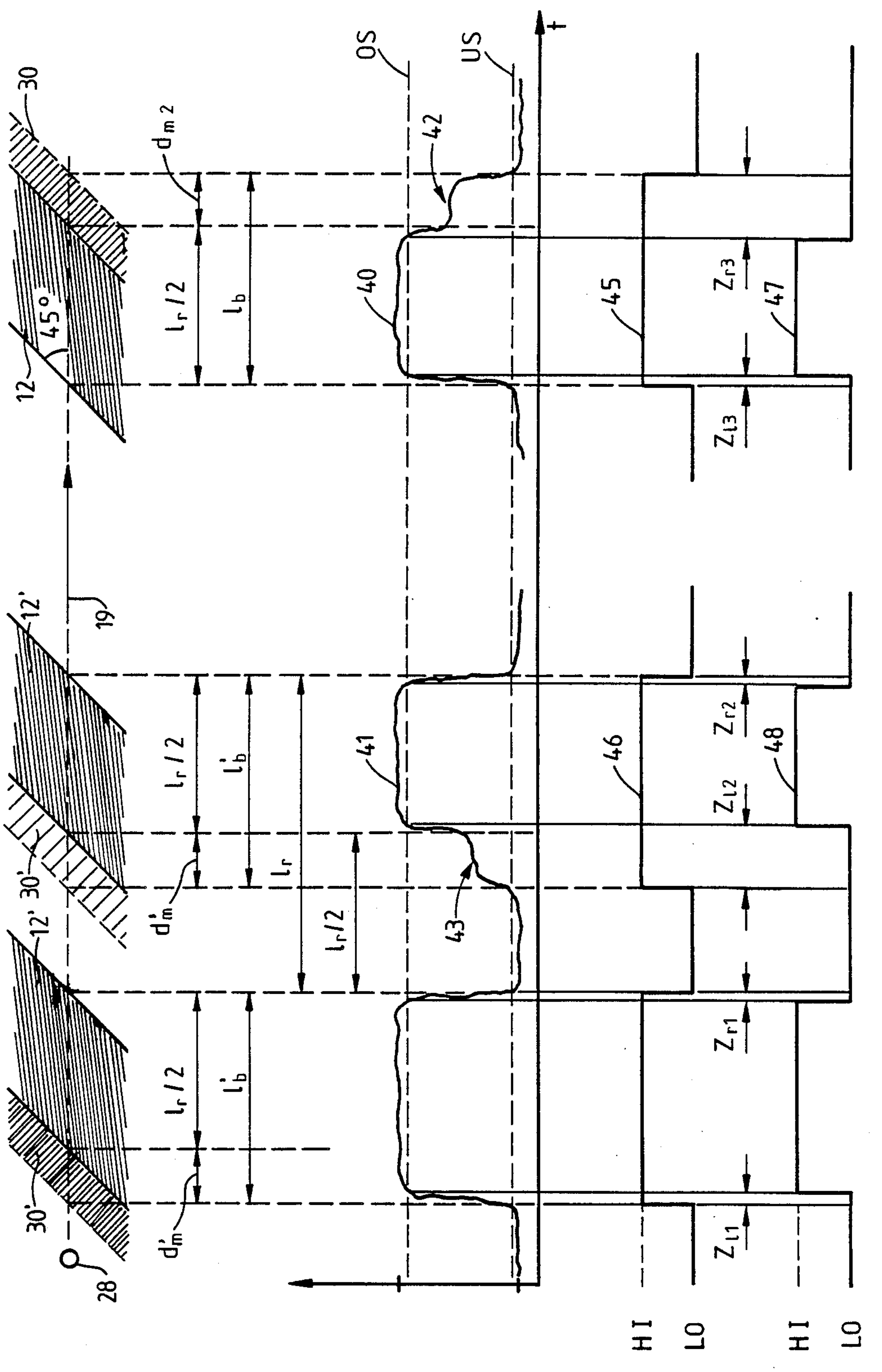
FIG. 4 shows examples data signals.

The relation between the measured values and the geometrical features on the test pattern 11 is described in what follows with reference to FIG. 4.

Right at the top of FIG. 4 high magnified parts of three test pattern strips 12 and 12' with the associated double dot printing edges 30 and 30' are to be seen, the density of shading being intended to indicate the gray tone. In the arrangement illustrated and with the direction of motion 19 of the paper 10 the test pattern strip 12, 30 to be seen on the extreme right corresponds to the strip of the right row 14 of the test pattern 11 to be seen in FIG. 3. On the left hand side of FIG. 4 two adjacent test pattern strips 12' from one row of the test pattern 11 are to be seen, the length $l_r/2$ between two strips 12 being equal to the length $l_r/2$ on the strip. The plane of measurement is, owing to the fishbone pattern of the test pattern strip 12, at a certain angle to the strips 12. The angle amounts in the present example to 45°. The relevant factor governing the relation between the measurements and the strip geometry is thus not the breadth of the strips but the distance between the points of intersection of the strips and the plane of measurement. The relevant lengths 1 are indicated under the strips 12 and 12' in FIG. 4.

By means of the optical sensor 20 and the light guide 38 extending through the left hole 21 the gray value of the moving paper 10 is scanned on the plane of measurement shown in FIG. 4. The gray value signals so determined are indicated in FIG. 4 in the middle in the form of the curves 40 and 41. In this respect the strips 12 and 1' are in the full density range of the gray value scale, while the double print edges generally have a lower gray value. In FIG. 4 the somewhat more heavily shaded right double printed edge 30 is given a denser gray value than the middle double printed edge 30' which is less heavily shaded, whose gray value is represented as the curve part 43. The left double printed edge 30' is indicated in full density.

In order to determine the detected breadths $l_b$ of the actually printed strips a threshold value (US) is computed, which is just over the gray value (P) for the non-printed paper. In order to detect very weak or faint double print edges as well, the lower threshold value (US) is selected to be as near as possible to the gray value (P) for the paper. The gray value signal 40 and, respectively, 41 over the lower threshold value is converted into a rectangular signal 45 and 46. The breadth of the rectangular signals 45 and 46 is equal to the length $l_b$ of the printed zone and is proportional thereto. By substrating the known strip breadth $l_r/2$ from the measured value $l_b$ the result is a first measurement $d_{m2}$ for the double printed edge 30.

Using the second light guide 28 at the same time a length $l_b$ is determined for a strip 12 of the left row 13 and thus a corresponding measurement $d_{m1}$ for the double printed edges 30 of the left row 13. Taking into account the geometrical features indicated in FIG. 3 it is then possible to derive from these values the degree of double printing in the circumferential direction $d_u$ and the degree of double printing in the axial direction $d_a$ as follows:

$$d_{m1} = du - da$$

$$d_{m2} = du + da$$

$$du = (d_{m1} + d_{m2})/2 \quad (1)$$

$$da = (d_{m2} - d_{m1})/2. \quad (2)$$

The above computed degrees of double dot print are absolute quantities, in which the direction of the double dot print effect is not indicated.

In order to determine the direction of double dot printing for each logic signal 45 and 46 an associated logic signal 47 and 48 is determined for the printed zones, which corresponds to the measured full density. For this purpose an upper threshold value (OS) is ascertained which is just under the actual full density tone (V). The full density logic signals 47 and 48 thus do not contain any gray value fractions below the full tone density or, respectively, the upper threshold value and thus as a rule do not contain the double printed edge, as is clearly indicated in the two right rectangular signals 47 and 48. On the basis of the relative timing of the two logic signals 45 through 48 for the printed zone and, respectively, the original strips it is possible to directly see the direction of double dot printing, that is to say by comparing the distances between the rising and the descending signal flanks If this distance $z_{12}$ between the ascending flanks of the two signals is greater than the distance $z_{r2}$ between the descending flanks, then the direction of double dot printing is negative, that is to say trailing. In the other case, as is indicated with the logic signals 45 and 47 of the representation of FIG. 3, the direction of double dot printing is positive, that is to say leading, if the direction of motion 19 of the paper web is also taken into account.

The left representation in FIG. 4, in which the double printing edge has the full density gray, hardly ever occurs in practice. In the case of a double printing edge with the same tone density as the original strips the distances $z_{11}$ and, respectively, $z_{r1}$ between the ascending and, respectively, the descending flanks are very similar so that the direction of double dot printing would not be able to be detected. In practice however such a coincidence between the two rectangular signals would indicate that there is no double dot printing offset.

The processing and evaluation of the logic signals 45 and 46 for ascertaining the offset in the direction of paper motion $d_m$ may be undertaken from various different aspects. If the speed v of the paper feed and the measured length $l_r/2$ of the original strip 12 are known, then it is possible to compute the double dot printing offset $d_m$ by time measurement $\Delta t$ with respect to the rectangular pulses 45 and 46 or by counting a clock pulse of known cycle duration T.

From the geometrical relationships, which are indicated in FIG. 4 at the top, we have for the desired length $d_m$ $$d_m = l_b - l_r/2 \quad (2).$$

If the measurement of the length of the printed zone is related to a measurement of time, then using the equation $$l_b = \Delta t_b \cdot v \quad (3)$$

we will have the function for the desired length $d_m$ as dependent on the times measured using the formula:

$$d_m = \Delta t_b \cdot v - l_r/2 = f(\Delta t) \quad (4).$$

If the time interval t is to be determined by counting the clock pulses with a cycle time of T $$\Delta t_b = n_b \cdot T \quad (5)$$

then the desired length $d_m$ may be computed using the following relationship as a function of the count $n_b$ $$d_m = n_b \cdot T \cdot v - l_r/2 = \pm f(n_b) \quad (6).$$

If in the formula (6) the speed v is derived from the test pattern strip distance $l_r$, taking into account the equations (3) and (5) we then have $$v = l_r/t_r \quad (7)$$

and $$v = l_r/n_rT \quad (8).$$

By incorporating the equation (8) in the equation (6) we have $$\begin{aligned} d_m &= n_bTl_r/n_rT - l_r/2 \\ &= (2n_b - n_r)/l_r/2 \\ &= |d_n| l_r/2. \end{aligned} \quad (9)$$

The first factor $d_n$ in the equation (9) may be taken to be a dimensionless relative degree of double dot printing, since it is in the range $-1 < d_n < +1$. It is directly computed on the basis of two measured counter distances $n_b$ and $n_r$ for the lengths $l_b$ and $l_r$. The direction of double dot printing is ascertained in the manner indicated above. The second factor $l_r/2$ may be referred to as the halftone dot factor. In represents the relation to the physical unit of length. The method for ascertaining the degree of double dot printing during operation of the press may be limited to ascertaining the relative degree $d_n$ of double printing, this involving the advantage that the halftone screen pitch does not have to be known at the start. Using the correction factor $l_r/2$ it is easily possible to compute the absolute degree of double dot printing, should this be necessary.

The upper and lower thresholds for the gray tones (FIG. 4) may be stored as constant values in the device 29 for detecting the degree of double dot printing. Since however the gray tone of the paper used, the printed full density tone and the lighting conditions frequently vary during the course of the printing process, it is to be recommended to also adapt the threshold values to suit the respective application in order to make possible exact determination of the degree of dot doubling. This may also be performed automatically in the so-called on line method. For this purpose either the two sensors present for detecting the degree of double dot printing are used or it is possibe to provide one or two additional sensors, the one of the being used to respond to the gray value of the paper and the other to respond to the full density gray tones.

In the first case at least one row of the test pattern strips is designed so as to have interruptions, as is indicated in FIG. 1 in row 13. The non-printed parts serve to detect the gray value of the paper, while the full density gray tone is derived from the maximum value of the gray value signals 40 and 41 of the test screen pattern 11. In the case of the use of additional sensors for the ascertainment of the threshold values it is possible to print additional full density tone zones along with the test screen pattern 11, as for instance the two full density tone strips 31 in FIG. 1. In this case the light guides associated with the additional sensors would be arranged to extend through the holes 32 and 33 marked in broken lines in the measuring cylinder 18, the left light guide serving for detecting the gray value for the paper and the right light guide serving for measuring the full density gray tone.

Figure 5:
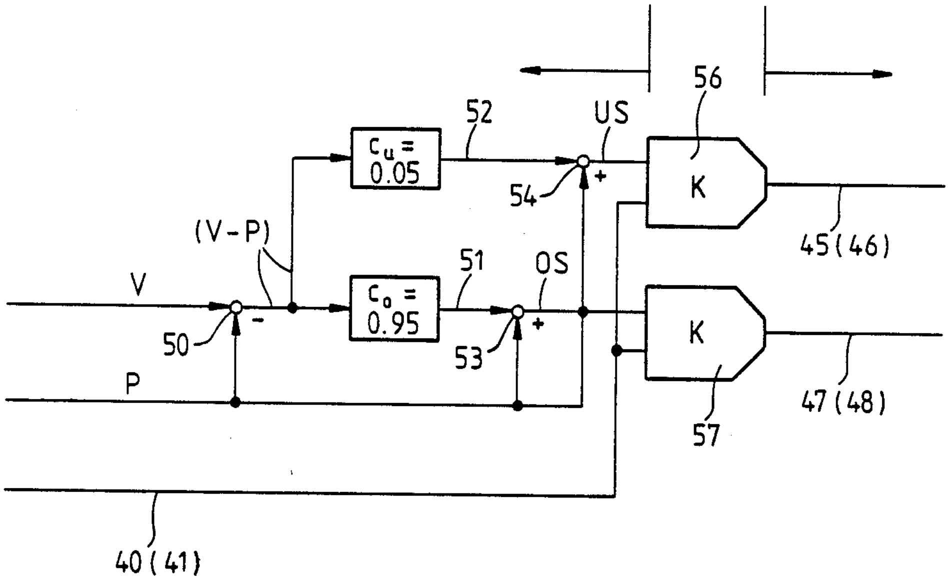
FIG. 5 is a schematic of a circuit for forming the rectangular signals from the data signals.

FIG. 5 shows a schematic of the circuit for converting the sensor signals into threshold values and for the formation of the rectangular signals. In a difference forming unit 50 the signals for the full density tone (V) and for the gray value (P) of the paper are processed to form the difference V−P, which represents the entire range of measurement. The difference V−P is multiplied on the one hand by a relative threshold value factor $c_o=0.95$ and on the other hand by a relative threshold value factor $c_u=0.05$. The signals 51 and, respectively, 52 so produced are respectively passed to an adder 53 and, respectively, 54, where they respectively have the gray value signal (P) for the paper added to them. The sum of the gray value for the paper with 95% of the measuring range results in the absolute gray value for the upper threshold value. The sum of the gray value (P)) for the paper and 5% of the measuring range on the other hand leads to the lower threshold value (US). The threshold values ascertained (US) and (OS) are respectively used in a comparator 56 and, respectively, 57 in connection with the measured gray value signal 40 and, respectively, 41 for forming the rectangular signals 45 and, respectively, 46 for the printed zones of the test screen patterns 11 and the rectangular signals 47 and, respectively, 48 for the full density tone zones of the strip pattern.

The accuracy of ascertainment of the degree of double dot printing depends predominantly on the correctness of the rectangular signal 45 and 46 produced, which in turn depends on the lower threshold value (US) and thus on the relative threshold value factor $c_u$. The threshold value has to be ascertained empirically and its value should be in a range of 0.05 to 0.10.

The application of the above described measuring method using transmitted light in connection with references for full density tone and non-printed paper is characterized by the following advantages. The hardware may be made up using standard commercially available light guide components, which furthermore do not require any adjustment or precise setting of distances between the paper and the sensors, since the paper abuts the light guides extending through the hole in the measuring cylinder and thus directly abuts the sensor. The device, which is robust so that it is no affected by vibrations and the like, does not require any optical components such as lenses and is thus not likely to fail owing to accumulation of dirt, since smooth and homogeneous surfaces may be provided, on which the paper web runs. If all the sensors are supplied from a single illuminating means, variations in the intensity of illumination will not affect the measurements.

I claim:

1. A method for measuring offset between doubly printed elements in a printing system comprising printing a test screen pattern consisting of test pattern strips, such strips being arranged so as to comply with a fishbone pattern and scanning the gray tone values of this test screen pattern by means of two sensors and evaluating measured data so obtained.

2. The method as claimed in claim 1 wherein the test screen pattern is scanned during operation of the printing system.

3. The method as claimed in claim 1 wherein the test pattern strip has the rows of said fishbone pattern arranged at an angle of 90° to each other and the test pattern strips have the same breadth as gaps therebetween.

4. The method as claimed in claim 1 wherein in at least one row of the test pattern strip the test pattern strips are separated from each other by non-printed areas in the strip groups.

5. The method as claimed in claim 1 wherein as the printed paper runs through the said system the sensors are guided parallel to the apex of the fishbone pattern over the test pattern strip rows.

6. The method as claimed in claim 1 wherein rectangular signals are derived from measured gray value signals, such rectangular signals representing the gray values and being above a predetermined lower threshold value and wherein the breadth of the rectangular signals is evaluated in order to determined the breadth of the printed test pattern strips.

7. The method as claimed in claim 6 wherein a lower threshold value is selected which is a short distance above the gray value for the non-printed paper.

8. The method as claimed in claim 6 wherein in addition to the lower threshold value an upper threshold value is established, which is a short distance under the full density tone gray value and wherein furthermore in addition to the rectangular signal for the measured printed zone a rectangular signal for the gray values above the upper threshold value is formed and wherein the direction of the double dot printing is determined from the difference of the ascending flanks and the difference of the descending flanks of the two rectangular signals.

9. The method as claimed in claim 6 wherein the rectangular signals are clocked with a certain clock rate and in that the clock pulses are counted and the count is used to compute the double element printing offset.

10. The method as claimed in claim 9 wherein on the basis of the measurement signals and of the count a relative degree of double element printing offset is ascertained using the equation $$d_n = \pm(2n_b - n_r)/n_r$$

wherein $d_n$ is the relative degree of double element offset, $n_b$ is the count for the breadth of the printed test pattern strip, $n_r$ is the count for the distance between the initial and terminal edges of two adjacent strips of the test screen pattern.

11. The method as claimed in claim 1 wherein a mean value is used derived from the measured values for a predetermined number of test pattern strips and used for the computation of the double element printing offset.

12. The method as claimed in claim 1 wherein in addition full density tone zones of the non-printed paper are scanned and from these full density tone signals and gray values for the paper threshold values for the determination of the degree of double element printing are derived.

13. The method as claimed in claim 12 wherein the threshold values are determined and modified by hardware features.

* * * * *